United States Patent [19]

Gauer et al.

[11] Patent Number: 5,532,876
[45] Date of Patent: Jul. 2, 1996

[54] REMOTELY CONTROLLED, DAY/NIGHT MIRROR APPARATUS

[76] Inventors: Edgar J. Gauer, 3196 Lonesome Dove Cir., El Paso, Tex. 79936; John B. Doyle, 2381 Gulf to Bay Boulevard #462, Clearwater, Fla. 34625

[21] Appl. No.: 191,393

[22] Filed: Feb. 2, 1994

[51] Int. Cl.⁶ .................................................. B60R 1/08
[52] U.S. Cl. ........................ 359/604; 359/843; 359/875
[58] Field of Search ................................. 359/603, 604, 359/605, 606, 607, 608, 875, 601, 602, 840, 875, 884, 353, 843

[56] References Cited

U.S. PATENT DOCUMENTS

| | | | |
|---|---|---|---|
| 3,233,515 | 2/1966 | Platzer, Jr. et al. | 359/603 |
| 3,550,456 | 12/1970 | Pringle | 359/606 |
| 3,588,231 | 6/1971 | Platzer, Jr. | 359/604 |
| 3,650,606 | 3/1972 | Van Noord | 359/607 |
| 3,655,273 | 4/1972 | Pringle | 359/606 |
| 3,712,149 | 1/1973 | Van Noord | 74/502.1 |
| 3,722,984 | 3/1973 | Brean | 359/605 |
| 3,810,690 | 5/1974 | Klein et al. | 359/607 |
| 3,836,235 | 9/1974 | Russell | 359/605 |
| 4,031,772 | 6/1977 | DeCastri | 74/502.1 |
| 4,072,065 | 2/1978 | Perrella | 74/502 |
| 4,084,886 | 4/1978 | Grosch et al. | 359/606 |
| 4,560,250 | 12/1985 | Russell | 359/604 |
| 4,614,404 | 9/1986 | Greene et al. | 359/604 |
| 4,660,944 | 4/1987 | Suzuki et al. | 248/479 |
| 4,684,216 | 8/1987 | Neumann | 359/604 |
| 4,726,656 | 2/1988 | Schofield et al. | 359/886 |
| 4,981,279 | 1/1991 | Andreas et al. | 248/483 |
| 4,993,822 | 2/1991 | Mittelhäuser | 359/877 |
| 5,033,835 | 7/1991 | Platzer, Jr. | 359/877 |
| 5,052,792 | 10/1991 | McDonough | 359/843 |
| 5,177,642 | 1/1993 | Wakimoto | 359/844 |
| 5,450,246 | 9/1995 | Jain | 359/877 |

FOREIGN PATENT DOCUMENTS

| | | | |
|---|---|---|---|
| WO82/01352 | 4/1982 | WIPO | 359/603 |

*Primary Examiner*—Paul M. Dzierzynski
*Assistant Examiner*—John Juba, Jr.

[57] ABSTRACT

A new and improved remotely controlled, day/night mirror apparatus includes an outer housing assembly for connection to an exterior portion of a motor vehicle. An inner housing support assembly is contained within the outer housing assembly and is supported by the outer housing assembly. An inner housing assembly is provided, and an adjustable connection assembly is connected between the inner housing assembly and the inner housing support assembly, for adjusting an angular orientation of the inner housing assembly with respect to the outer housing assembly. A day/night mirror assembly is pivotally supported by the inner housing assembly by a mirror pivot pin. An incremental tilt assembly is connected between the day/night mirror assembly and the inner housing assembly distal from the mirror pivot pin, for incrementally tilting the day/night mirror assembly around the mirror pivot pin from a day position to a night position and vice versa. An incremental control assembly is connected to the incremental tilt assembly for incrementally controlling the incremental tilt assembly. The incremental control assembly includes an exterior portion connected to the incremental tilt assembly, an intermediate portion connected to the exterior portion, and an interior portion connected to the intermediate portion. The interior portion is located inside a passenger compartment of the motor vehicle, and the exterior portion is located within the outer housing assembly which is outside the passenger compartment of the motor vehicle.

3 Claims, 3 Drawing Sheets

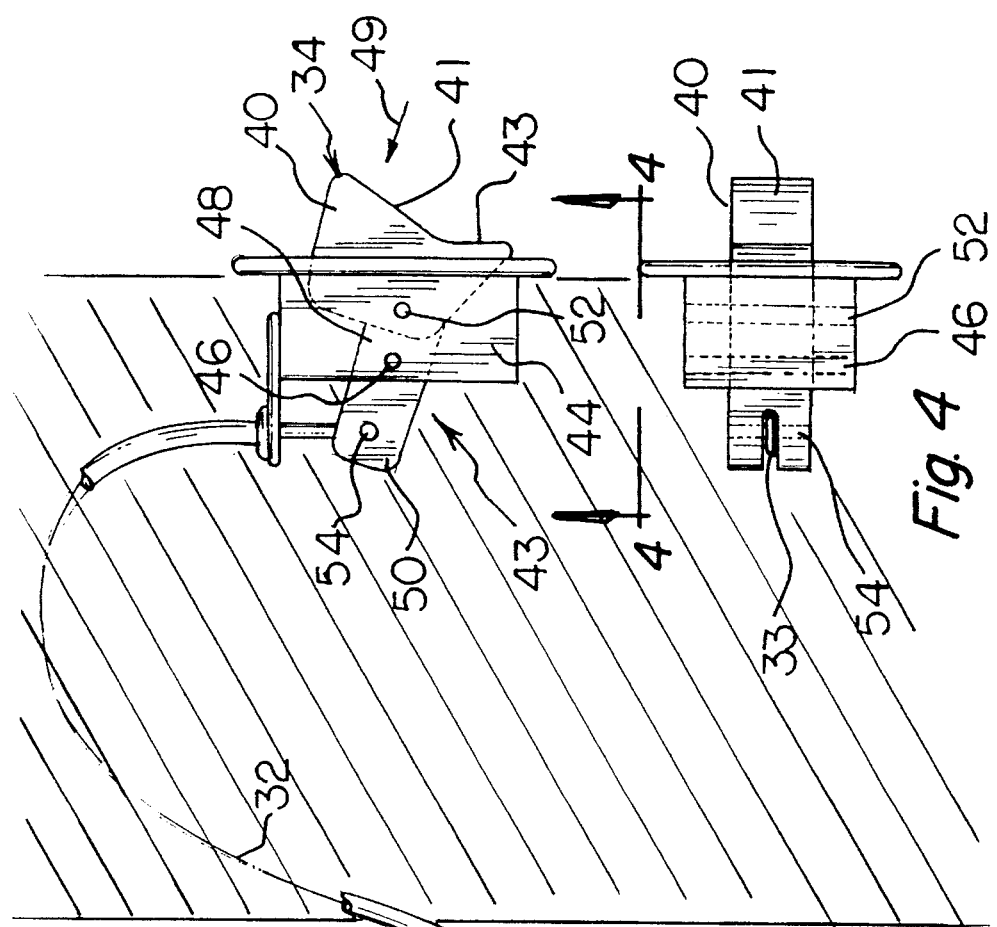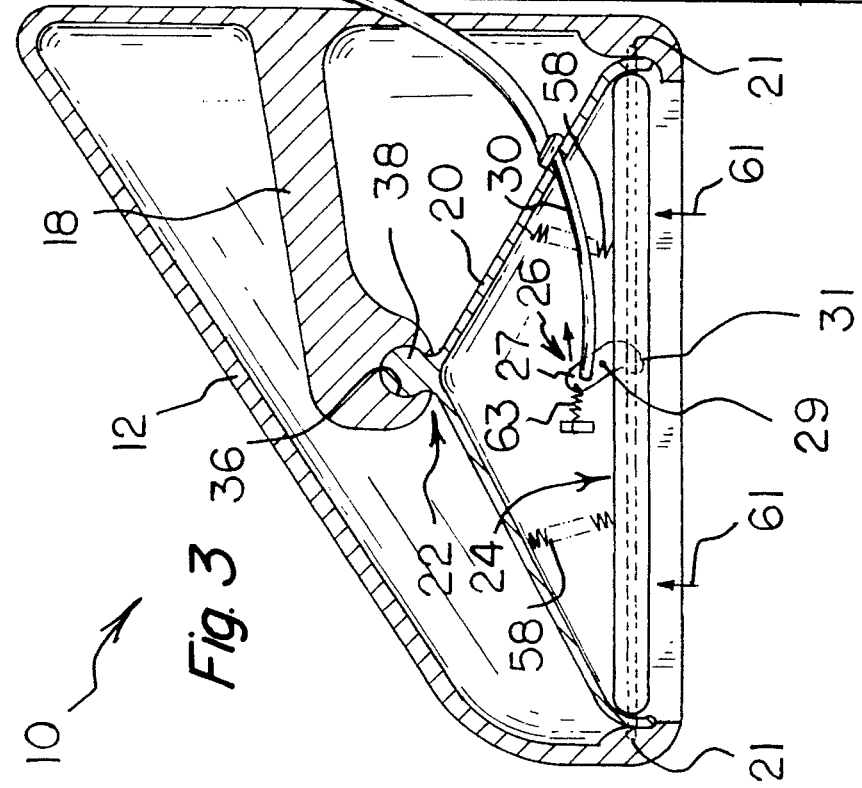

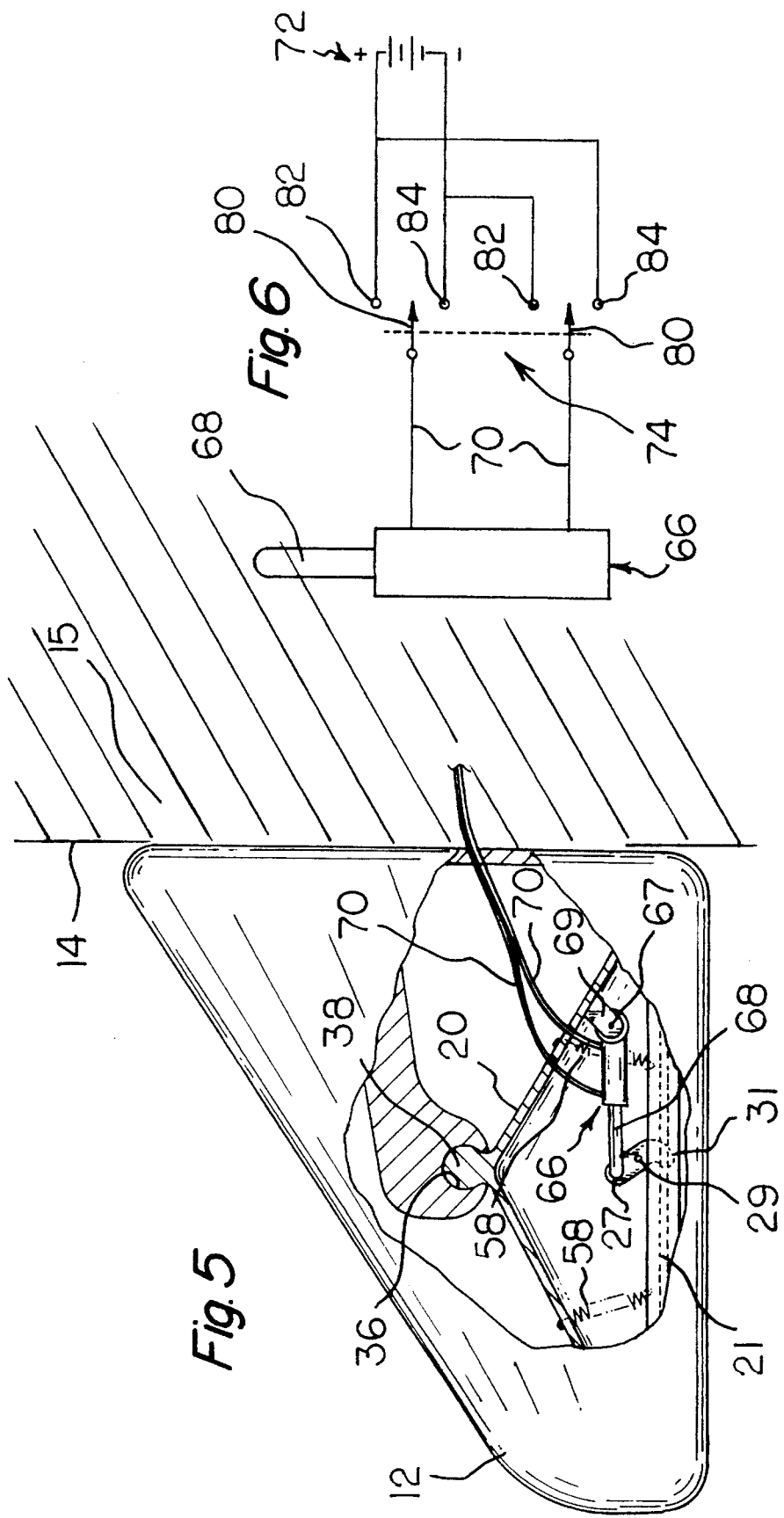

REMOTELY CONTROLLED, DAY/NIGHT MIRROR APPARATUS

BACKGROUND OF THE INVENTION

1. Field of the Invention

The present invention relates generally to mirrors used on vehicles and, more particularly, to rear view mirrors placed on the sides of vehicles outside the passenger compartment.

2. Description of the Prior Art

Day/night mirrors are well known for use in a passenger compartment of an automobile. During the day, the day/night mirror is oriented so that the scene from the rear window is directly reflected into the driver's eyes. At night, however, a reflection of headlights from automobiles at the rear of a vehicle directly into the eyes of the driver may be irritating and even blinding. As a result, the day/night mirror is manually moved a discrete increment of distance by the driver so that the reflection of the scene from the rear window is attenuated before it reaches the driver's eyes. With the attenuated reflection of the day/night mirror, headlight glare from vehicles behind the driver is significantly reduced.

In sharp contrast, mirrors that are placed outside the passenger compartment of a vehicle, such as on the left and right sides of the vehicle, are not equipped with the day/night mirrors. As a result, headlight glare from vehicles behind the driver is reflected off of the side view mirrors directly into the driver's eyes. In this respect, it would be desirable if an outside, side view mirror were provided which included a day/night mirror.

For convenience, it is desired that outside, side view mirrors are controllable by the driver from inside the passenger compartment of the vehicle. That is, an outside, side view mirror is remotely controlled by the driver from inside the passenger compartment of the vehicle. When this is the case, the driver need not roll down a window and expose oneself to cold and rain to adjust an outside, side view mirror. By the same token, it would be desirable if an outside, side view, day/night mirror were remotely controlled from inside the passenger compartment of the vehicle.

Throughout the years, a number of innovations have been developed relating to outside, side view mirrors, and the following U.S. Pat. Nos. are representative of some of those innovations: 4,660,944; 4,981,279; 4,993,822; 5,033,835; and 5,177,642. More specifically, in U.S. Pat. Nos. 4,660,944, 4,981,279, 4,993,822, and 5,177,642, an outside, side view mirror is remotely adjusted by manual control from inside the passenger compartment of the vehicle. It is recalled, however, that with a conventional, day/night mirror located in the passenger compartment of a vehicle, the mirror is moved from its position as a day mirror to its position as a night mirror by a predetermined incremental tilt. However, none of the cited U.S. Pat. Nos. 4,660,944, 4,981,279, 4,993,822, and 5,177,642 provide for such an incremental mirror tilt to shift the mirror from a day to a night position. Instead, the cited patents provide for a continuum of manual control through a wide range of mirror adjustments. In this respect, it would be desirable if a remotely controlled, outside, side view mirror were provided with a predetermined incremental movement of the mirror from a daytime position to a nighttime position.

The other patent cited above, U.S. Pat. No. 5,033,835, discloses remotely controlled, motor-operated mirrors that cause the controlled mirror to scan a traffic pattern.

Still other features would be desirable in a remotely controlled, outside, day/night mirror apparatus. Although manual predetermined incremental control of an outside day/night mirror may be suitable for certain purposes, there may also be instances when it is desirable to control the incremental tilt of an outside day/night mirror by electric means. In this respect, it would be desirable if an outside, side view, day/night mirror were provided with remote electrical control of predetermined incremental mirror tilt from a daytime mode to a nighttime mode.

With a conventional inside day/night mirror that is present in the passenger compartment of a vehicle, there are two modes of adjustment of the mirror. The first mode of adjustment is for orientation of the mirror and its entire housing for appropriate viewing through the rear window. The second mode of adjustment is for the incremental tilt of the mirror within the mirror housing, but not tilting the mirror housing, from a daytime position to a nighttime position. In this respect, it would be desirable if an outside, side view, remotely controlled day/night mirror were provided with two modes of adjustment wherein the first mode of adjustment is for orientation of the mirror and its mirror housing for appropriate viewing of an outside side view, and wherein the second mode of adjustment is for the incremental tilt of the mirror, but not the mirror housing, from a daytime position to a nighttime position.

Since the day/night mirror has only two tilt positions, it would be desirable if the device for tilting the mirror had only two active positions. Moreover, it would be desirable if the mirror tilt control device toggled from the daytime to the nighttime tilt position and vice versa.

Thus, while the foregoing body of prior art indicates it to be well known to use remotely controlled outside mirrors, the prior art described above does not teach or suggest a remotely controlled, outside, day/night mirror apparatus which has the following combination of desirable features: (1) includes a day/night mirror; (2) is remotely controlled from inside the passenger compartment of the vehicle; (3) provides a predetermined incremental movement of the mirror from a daytime position to a nighttime position and vice versa; (4) provides remote electrical control of predetermined incremental mirror tilt from a daytime mode to a nighttime mode and vice versa; (5) provides two modes of adjustment wherein the first mode of adjustment is for orientation of the mirror and its mirror housing for appropriate viewing of an outside side view, and wherein the second mode of adjustment is for the incremental tilt of the mirror, but not the mirror housing, from a daytime position to a nighttime position and vice versa; and (6) provides a mirror tilt control device which toggles from the daytime to the nighttime tilt position and vice versa. The foregoing desired characteristics are provided by the unique remotely controlled, day/night mirror apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved remotely controlled, day/night mirror apparatus which includes an outer housing assembly for connection to an exterior portion of a motor vehicle. An inner housing support assembly is contained within the outer housing assembly and is supported by the outer housing assembly.

An inner housing assembly is provided, and an adjustable connection assembly is connected between the inner housing assembly and the inner housing support assembly, for adjusting an angular orientation of the inner housing assembly with respect to the outer housing assembly. A day/night mirror assembly is pivotally supported by the inner housing assembly by a mirror pivot pin. An incremental tilt assembly is connected between the day/night mirror assembly and the inner housing assembly distal from the mirror pivot pin, for incrementally tilting the day/night mirror assembly around the mirror pivot pin from a day position to a night position and vice versa. An incremental control assembly is connected to the incremental tilt assembly for incrementally controlling the incremental tilt assembly. The incremental control assembly includes an exterior portion is connected to the incremental tilt assembly, an intermediate portion connected to the exterior portion, and an interior portion connected to the intermediate portion. The interior portion is located inside a passenger compartment of the motor vehicle, and the exterior portion is located within the outer housing assembly which is outside the passenger compartment of the motor vehicle.

The adjustable connection assembly between the inner housing support assembly and the inner housing assembly includes a socket assembly attached to the inner housing support assembly and a complementary ball assembly attached to the inner housing assembly.

The exterior portion of the incremental control assembly includes a first portion of a cable which is connected to the incremental tilt assembly. The intermediate portion of the incremental control assembly includes a second portion of a cable that is connected to the exterior portion. The interior portion of the incremental control assembly includes a two-position toggle lever assembly supported by a door of the motor vehicle for actuating the exterior portion through the intermediate portion.

The incremental control assembly includes a bracket supported by the motor vehicle, a lever arm assembly, and a first hinge pin supporting the lever arm assembly on the bracket. The first hinge pin serves as a fulcrum for the lever arm assembly and divides the lever arm assembly into a first lever arm and a second lever arm. A two-position toggle lever assembly includes a first pressure-receiving surface and a second pressure-receiving surface. A second hinge pin connects the two-position toggle lever assembly to the first lever arm. A third hinge pin connects the intermediate portion to the second lever arm.

The exterior portion of the incremental tilt assembly includes an electrically powered solenoid assembly which is connected to the inner housing assembly. The electrically powered solenoid assembly includes a plunger which is connected to a first end of a pivoted tilt lever for moving the pivoted tilt lever an incremented amount from a day position to a night position and vice versa. The electrically powered solenoid assembly is supported on the inner housing assembly by a hinge pin and a support strut. When the plunger of the electrically powered solenoid assembly moves the first end of the pivoted tilt lever an incremented amount from the day position to the night position and vice versa, the electrically powered solenoid assembly rotates around the hinge pin.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved remotely controlled, day/night mirror apparatus which has all of the advantages of the prior art and none of the disadvantages.

It is another object of the present invention to provide a new and improved remotely controlled, day/night mirror apparatus which may be easily and efficiently manufactured and marketed.

It is a further object of the present invention to provide a new and improved remotely controlled, day/night mirror apparatus which is of durable and reliable construction.

An even further object of the present invention is to provide a new and improved remotely controlled, day/night mirror apparatus which is susceptible of a low cost of manufacture with regard to both materials and labor, and which accordingly is then susceptible of low prices of sale to the consuming public, thereby making such remotely controlled, day/night mirror apparatus available to the buying public.

Still yet a further object of the present invention is to provide a new and improved remotely controlled, outside mirror apparatus which includes a day/night mirror.

Still another object of the present invention is to provide a new and improved remotely controlled, day/night mirror apparatus that is remotely controlled from inside the passenger compartment of the vehicle.

Yet another object of the present invention is to provide a new and improved remotely controlled, day/night mirror apparatus which provides a predetermined incremental movement of the mirror from a daytime position to a nighttime position and vice versa.

Even another object of the present invention is to provide a new and improved remotely controlled, day/night mirror apparatus that provides remote electrical control of predetermined incremental mirror tilt from a daytime mode to a nighttime mode and vice versa.

Still a further object of the present invention is to provide a new and improved remotely controlled, day/night mirror apparatus which provides two modes of adjustment wherein the first mode of adjustment is for orientation of the mirror and its mirror housing for appropriate viewing of an outside side view, and wherein the second mode of adjustment is for the incremental tilt of the mirror, but not the mirror housing, from a daytime position to a nighttime position and vice versa.

Yet another object of the present invention is to provide a new and improved remotely controlled, day/night mirror apparatus that provides a mirror tilt control device which toggles from the daytime to the nighttime tilt position and vice versa.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged cross-sectional view of the embodiment of the invention shown in FIG. 2 taken along line 3—3 thereof, also showing a manually operated remote control cable assembly.

FIG. 4 is a bottom view of the manual toggle actuator assembly of the embodiment of the invention shown in FIG. 3 taken along line 4—4 of FIG. 3.

FIG. 5 is a partially broken away and partial cross-sectional view of a second embodiment of the remotely controlled, day/night mirror apparatus of the invention which includes an electrically actuated, incremental, mirror tilt assembly.

FIG. 6 is an electrical circuit diagram for the embodiment of the invention shown in FIG. 5.

DESCRIPTION OF THE PREFERRED EMBODIMENT

With reference to the drawings, a new and improved remotely controlled, day/night mirror apparatus embodying the principles and concepts of the present invention will be described.

Figure 1:
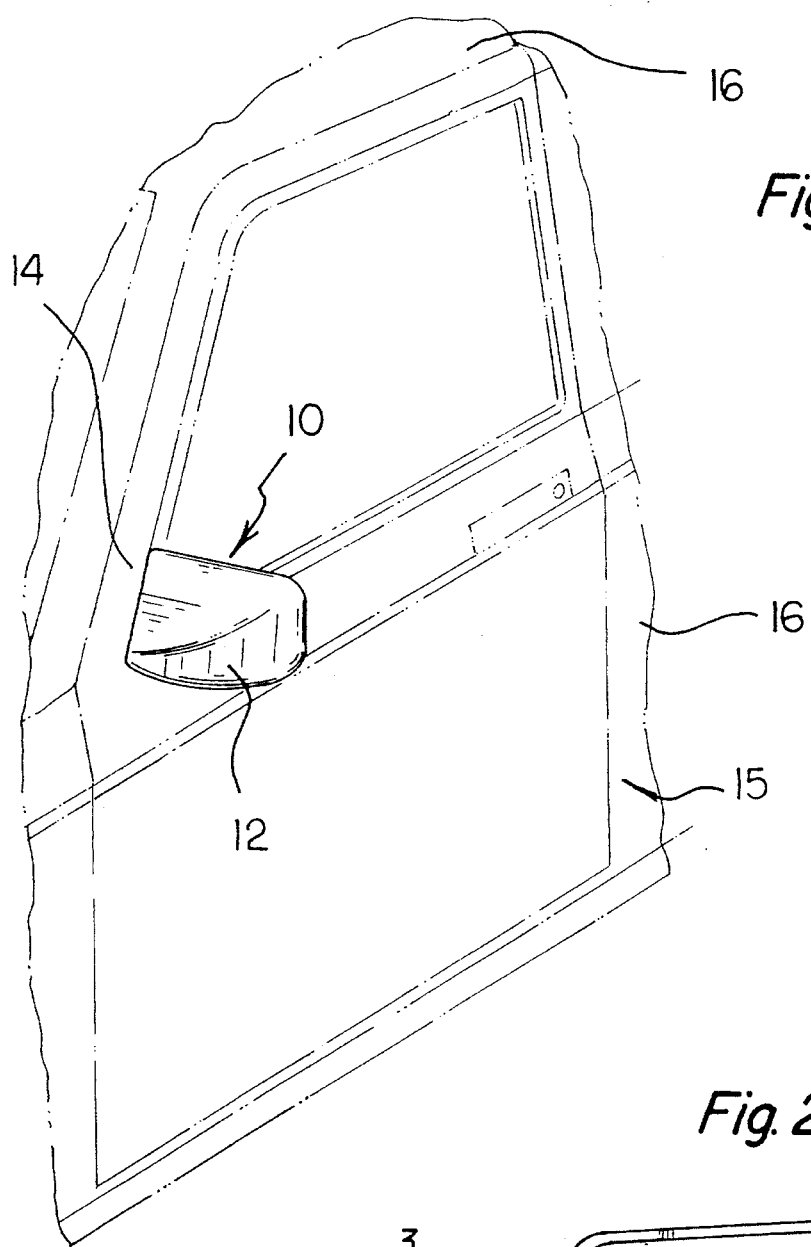
FIG. 1 is a perspective view showing a first preferred embodiment of the remotely controlled, day/night mirror apparatus of the invention installed in the door of a motor vehicle.
Figure 2:
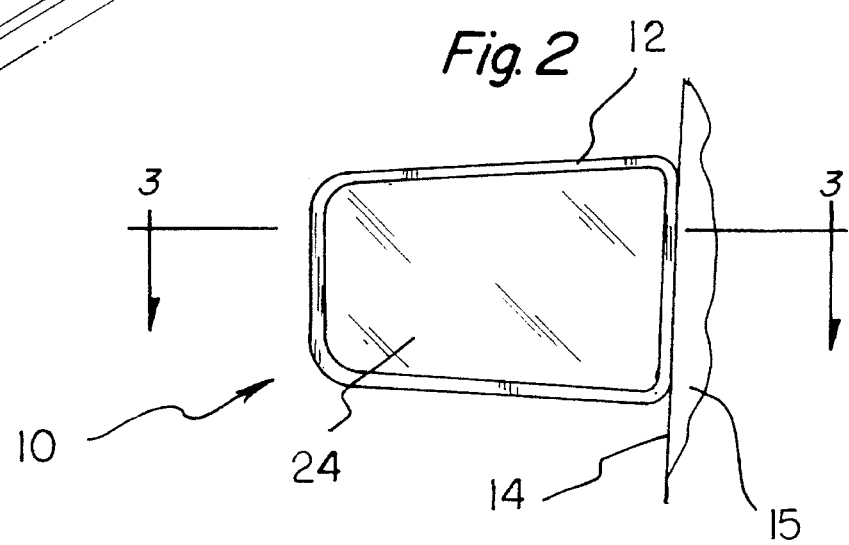
FIG. 2 is an enlarged rear view of the embodiment of the remotely controlled, day/night mirror apparatus shown in FIG. 1 installed on the vehicle door.

Turning to FIGS. 1–4, there is shown a first exemplary embodiment of the remotely controlled, day/night mirror apparatus of the invention generally designated by reference numeral 10. In its preferred form, remotely controlled, day/night mirror apparatus 10 includes an outer housing assembly 12 for connection to an exterior portion 14 of a motor vehicle 16, such as an outside surface 14 of a door 15 of an automobile 16. An inner housing support assembly 18 is contained within the outer housing assembly 12 and is supported by the outer housing assembly 12. An inner housing assembly 20 is provided, and an adjustable connection assembly 22 is connected between the inner housing assembly 20 and the inner housing support assembly 18, for adjusting an angular orientation of the inner housing assembly 20 with respect to the outer housing assembly 12. A day/night mirror assembly 24 is pivotally supported by the inner housing assembly 20 by a mirror pivot pin 21. An incremental tilt assembly 26 is connected between the day/night mirror assembly 24 and the inner housing assembly 20 distal from the mirror pivot pin 21, for incrementally tilting the day/night mirror assembly 24 around the mirror pivot pin 21 from a day position to a night position and vice versa. An incremental control assembly is connected to the incremental tilt assembly 26 for incrementally controlling the incremental tilt assembly 26. The incremental control assembly includes an exterior portion 30 is connected to the incremental tilt assembly 26, an intermediate portion 32 connected to the exterior portion 30, and an interior portion 34 connected to the intermediate portion 32. The interior portion 34 is located inside a passenger compartment of the motor vehicle 16, and the exterior portion 30 is located within the outer housing assembly 12 which is outside the passenger compartment of the motor vehicle 16.

The day/night mirror assembly 24 that is used with the remotely controlled, day/night mirror apparatus of the invention may be identical to a conventional day/night mirror assembly 24 that is employed in a conventional rear view day/night mirror that is located in the passenger compartment of a motor vehicle 16.

The adjustable connection assembly 22 between the inner housing support assembly 18 and the inner housing assembly 20 includes a socket assembly 36 attached to the inner housing support assembly 18 and a complementary ball assembly 38 attached to the inner housing assembly 20. The ball and socket adjustable connection assembly 22 permits the inner housing assembly 20 to be adjusted with respect to the outer housing assembly 12 in a wide range of angular adjustments vertically, horizontally, and transversely.

The exterior portion 30 of the incremental control assembly includes a first portion of a cable which is connected to the incremental tilt assembly 26. The intermediate portion 32 of the incremental control assembly includes a second portion of a cable that is connected to the exterior portion 30. The interior portion 34 of the incremental control assembly includes a two-position toggle lever assembly 40 supported by a door 15 of the motor vehicle 16 for actuating the exterior portion 30 through the intermediate portion 32.

More specifically, as shown in FIG. 3, the incremental control assembly includes a bracket 44 supported by the motor vehicle 16, a lever arm assembly 43, and a first hinge pin 46 supporting the lever arm assembly 43 on the bracket 44. The first hinge pin 46 serves as a fulcrum for the lever arm assembly 43 and divides the lever arm assembly 43 into a first lever arm 48 and a second lever arm 50. A two-position toggle lever assembly 40 includes a first pressure-receiving surface 41 and a second pressure-receiving surface 43. A second hinge pin 52 connects the two-position toggle lever assembly 40 to the first lever arm 48. A third hinge pin 54 connects the intermediate portion 32 to the second lever arm 50.

In operation, when a person who is inside the passenger compartment of the motor vehicle 16 presses upon the first pressure-receiving surface 41 of the two-position toggle lever assembly 40, the two-position toggle lever assembly 40 is toggled from the day position shown in FIG. 3, to a night position (not shown). In the day position, the first pressure-receiving surface 41 is distal from the door 15, and the second pressure-receiving surface 43 is proximal to the door 15. On the other hand, in the night position, the first pressure-receiving surface 41 is proximal to the door 15, and the second pressure-receiving surface 43 is distal from the door 15.

When the first pressure-receiving surface 41 is pressed in the direction of arrow 49 to change the day/night mirror assembly 24 to the night position, the two-position toggle lever assembly 40 rotates around second hinge pin 52 a predetermined incremented amount causing the first lever arm 48 to rotate downward around the first hinge pin 46 an incremented amount and causing the second lever arm 50 to rotate upward around the first hinge pin 46 an incremented amount. As the second lever arm 50 moves upward an incremented amount, the second lever arm 50 rotates around the third hinge pin 54 an incremented amount and pushes the intermediate portion 32 of the incremental control assembly upward an incremented amount. The intermediate portion 32 is attached to the third hinge pin 54 by a loop 33. The loop 33 rotates around the third hinge pin 54 an incremented amount as the second lever arm 50 pushes against the intermediate portion 32. As the intermediate portion 32 is pushed by the second lever arm 50, the exterior portion 30 of the incremental control assembly pushes against a first end 27 of a pivoted tilt lever of the incremental tilt assembly 26 and moves the first end 27 an incremented amount. The first end 27 of the pivoted tilt lever pivots around pivot pin 29 an incremented amount causing a second end 31 of the pivoted tilt lever to tilt the day/night mirror assembly 24 an incremented amount around the mirror pivot pin 21 from the day position shown in FIG. 3 to the night position (not shown).

A pair of springs 58 is connected between the day/night mirror assembly 24 and the inner housing assembly 20 and urges the day/night mirror assembly 24 around the mirror pivot pin 21 in the direction of arrows 61 toward a night position, although the day position of the day/night mirror assembly 24 is shown in FIG. 3.

Once the day/night mirror assembly 24 is in the night position, when pressure is exerted by a person on the second pressure-receiving surface 43 of the two-position toggle lever assembly 40, the day/night mirror assembly 24 is tilted around the mirror pivot pin 21 an incremented amount by the incremental tilt assembly 26 toward the day position, in the direction opposing the arrows 61. When the day/night mirror assembly 24 is moved from the night position to the day position, the day/night mirror assembly 24 moves against the urging of the pair of springs 58 by an incremented amount.

The incremental tilt assembly 26 also includes an auxiliary spring 63 for urging the first end 27 of the pivoted tilt lever toward its day position.

Turning to FIGS. 5–6, a second embodiment of the invention is shown. Reference numerals are shown that correspond to like reference numerals that designate like elements shown in the other figures. In addition, the exterior portion 30 of the incremental tilt assembly 26 includes an electrically powered solenoid assembly 66 which is connected to the inner housing assembly 20. The electrically powered solenoid assembly 66 includes a plunger 68 which is connected to a first end 27 of a pivoted tilt lever for moving the pivoted tilt lever an incremented amount from a day position to a night position and vice versa. The electrically powered solenoid assembly 66 is supported on the inner housing assembly 20 by a solenoid hinge pin 67 and a support strut 69. When the plunger 68 of the electrically powered solenoid assembly 66 moves the first end 27 of the pivoted tilt lever an incremented amount from the day position to the night position and vice versa, the electrically powered solenoid assembly 66 rotates around the solenoid hinge pin 67.

The electrically powered solenoid assembly 66 is connected to an interior switch assembly 74 by a pair of electrical conductors 70. The motor vehicle battery 72 supplies electric power to the electrically powered solenoid assembly 66. The interior switch assembly 74 is a double-pole, double-throw switch which reverses the polarity of the current that is sent to the electrically powered solenoid assembly 66 when the interior switch assembly 74 is switched from a day position to a night position and vice versa. For example, when the movable contacts 80 are in circuit with first stationary contacts 82, the plunger 68 of the electrically powered solenoid assembly 66 is driven an incremented amount to the day position. On the other hand, when the movable contacts 80 are in circuit with the second stationary contacts 84, the plunger 68 of the electrically powered solenoid assembly 66 is driven an incremented amount to the night position.

If desired, two outside day/night mirror assemblies 24 can be connected to one interior switch assembly 74 for simultaneous control of both day/night mirror assemblies 24. Furthermore, if desired, the incremental tilt assemblies 26 of a solenoid-controlled interior rear view mirror and one or more solenoid-controlled outside mirrors can be controlled simultaneously by a single interior switch assembly 74. The interior switch assembly 74 can be located in the passenger compartment of the motor vehicle 16 where desired. For example, the interior switch assembly 74 can be located on the interior rear view mirror, on the steering wheel, on the dashboard, or on the driver's side door.

The components of the remotely controlled, day/night mirror apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved remotely controlled, day/night mirror apparatus that is low in cost, relatively simple in design and operation, and which may advantageously be used to include a day/night mirror. With the invention, a remotely controlled, day/night mirror apparatus is provided which is remotely controlled from inside the passenger compartment of the vehicle. With the invention, a remotely controlled, day/night mirror apparatus is provided which provides a predetermined incremental movement of the mirror from a daytime position to a nighttime position and vice versa. With the invention, a remotely controlled, day/night mirror apparatus is provided which provides remote electrical control of predetermined incremental mirror tilt from a daytime mode to a nighttime mode and vice versa. With the invention, a remotely controlled, day/night mirror apparatus is provided which provides two modes of adjustment wherein the first mode of adjustment is for orientation of the mirror and its mirror housing for appropriate viewing of an outside side view, and wherein the second mode of adjustment is for the incremental tilt of the mirror, but not the mirror housing, from a daytime position to a nighttime position and vice versa. With the invention, a remotely controlled, day/night mirror apparatus is provided which provides a mirror tilt control device which toggles from the daytime to the nighttime tilt position and vice versa.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved remotely controlled, day/night mirror apparatus, comprising:

an outer housing assembly for connection to an exterior portion of a motor vehicle, an inner housing support assembly contained within said outer housing assembly and supported by said outer housing assembly, an inner housing assembly, an adjustable connection assembly, connected between said inner housing assembly and said inner housing support assembly, for adjusting an angular orientation of said inner housing assembly with respect to said outer housing assembly, a day/night mirror assembly pivotally supported by said inner housing assembly by a mirror pivot, an incremental tilt assembly, connected between said day/night mirror assembly and said inner housing assembly distal from said mirror pivot, for incrementally tilting said day/night mirror assembly around said mirror pivot from a day position to a night position and vice versa, and an incremental control assembly, connected to said incremental tilt assembly, for incrementally controlling said incremental tilt assembly, wherein said incremental control assembly includes an exterior portion connected to said incremental tilt assembly, an intermediate portion connected to said exterior portion, and an interior portion connected to said intermediate portion, wherein said interior portion is located inside a passenger compartment of the motor vehicle, and said exterior portion is located within said outer housing assembly which is outside the passenger compartment of the motor vehicle; and wherein said incremental control assembly includes:
    a bracket supported by the motor vehicle
    a lever arm assembly,
    a first hinge pin supporting said lever arm assembly on said bracket, wherein said first hinge pin serves as a fulcrum for said lever arm assembly and divides said lever arm assembly into a first lever arm and a second lever arm,
    a two-position toggle lever assembly which includes a first pressure-receiving surface and a second pressure-receiving surface,
    a second hinge pin connecting said two-position toggle lever assembly to said first lever arm, and
    a third hinge pin connecting said intermediate portion to said second lever arm.

2. The apparatus described in claim 1 wherein said adjustable connection assembly between said inner housing support assembly and said inner housing assembly includes a socket assembly attached to said inner housing support assembly and a complementary ball assembly attached to said inner housing assembly.

3. The apparatus described in claim 1 wherein:

said exterior portion of said incremental control assembly includes a first portion of a cable connected to said incremental tilt assembly, said intermediate portion of said incremental control assembly includes a second portion of a cable connected to said exterior portion, and said interior portion of said incremental control assembly includes a two-position toggle lever assembly supported by a door of the motor vehicle for actuating said exterior portion through said intermediate portion.

* * * * *